Jan. 14, 1964  F. HEYN  3,117,539
HEAT EXCHANGE APPARATUS AND METHOD FOR OPERATING SAME
Filed Nov. 21, 1961
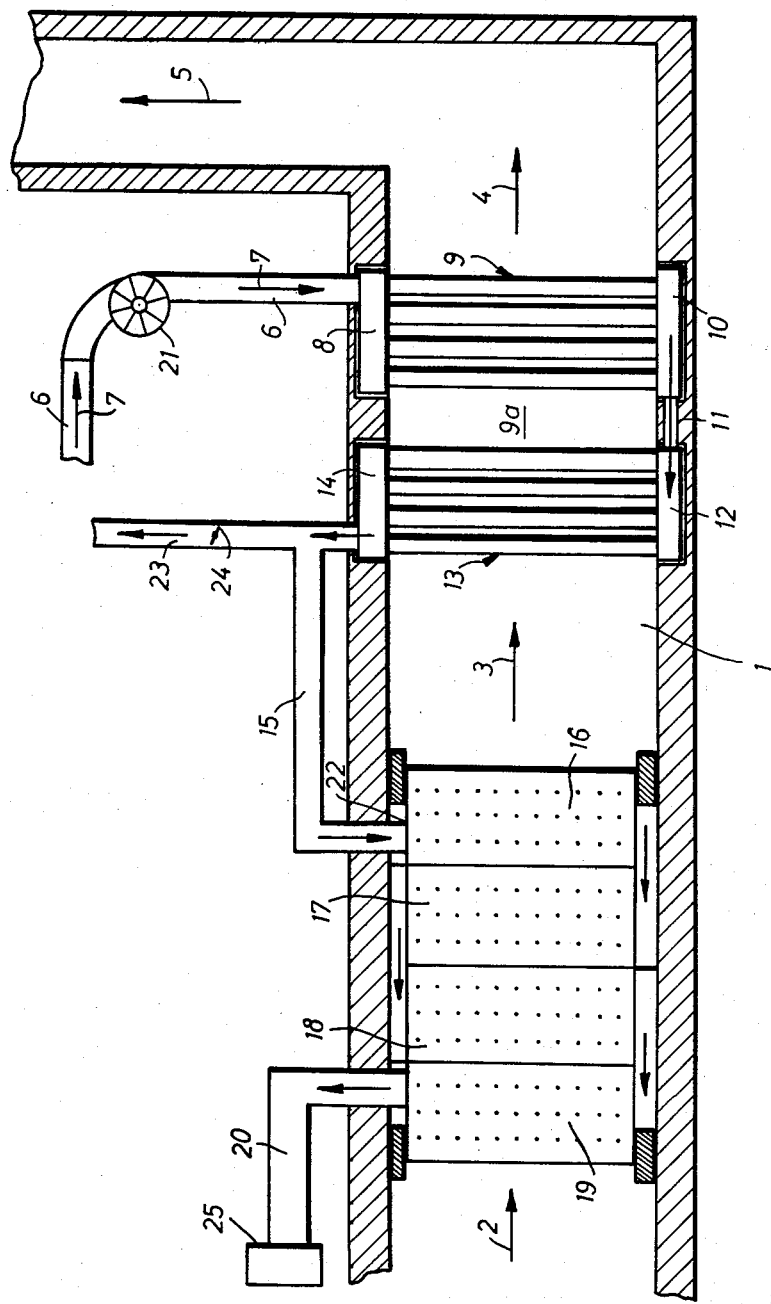
INVENTOR.
Friedbert Heyn
BY Webb, Mackey & Burden
HIS ATTORNEYS United States Patent Office 3,117,539
Patented Jan. 14, 1964

3,117,539
HEAT EXCHANGE APPARATUS AND METHOD FOR OPERATING SAME
Friedbert Heyn, Krefeld, Rhineland, Germany, assignor to Industrie-Compagnie Kleinewefers Konstruktions- und Handelsgesellschaft m.b.H., Krefeld, Germany, a corporation of Germany
Filed Nov. 21, 1961, Ser. No. 153,990
Claims priority, application Germany Nov. 23, 1960
3 Claims. (Cl. 110—56)

This invention relates to a method of operating a heat exchanger comprising a ceramic recuperator and a metal recuperator, and to the heat exchanger itself.

Ceramic recuperators have the advantage of high temperature stability, but also the disadvantage of requiring a large floor space, and of having poor airtightness and high sensitivity to great variations in temperature. Metal recuperators, on the other hand, have the advantage of requiring little floor space and of having high impermeability to gas, as well as being substantially unaffected by variations in temperature. Their disadvantage lies in their very limited usability at high temperatures. Therefore, in order to combine the advantages of both types of recuperators, a ceramic recuperator has been connected to the metal recuperator on the downstream side of the metal recuperator, relative to flow of air to be warmed through the two recuperators to make a combination heat exchanger.

In operating a heat exchanger of this type, a first branch air current, compressed to approximately 3000 mm. water column in conventional manner, is preheated in the metal recuperator, which draws or pulls a second branch air current through the ceramic recuperator in ejector-like fashion. The ratio of the air preheated in the metal recuperator to that preheated in the ceramic recuperator is approximately 1:2. According to another known process, a small pressure differential of 25 to 30 mm. water column is developed in the ceramic recuperator by having the air drawn or pulled by means of the kinetic energy of the fuel gas.

Both known methods have the disadvantage that the ceramic recuperator is charged with cold air, and from the varying inlet temperatures of the flue gas or from the operation of the soaking pits, thermal stresses arise in the ceramic recuperator which may lead to the rupture of the ceramic pipes thereof.

It has also been a known procedure in operation of the combination heat exchanger to reduce the fuel gas temperature in the ceramic portion to the temperature corresponding to the material properties of the metal recuperator. In this case, the combustion air which is to be preheated is forced through the metal recuperator with the result that there is an excess pressure on the downstream side in the ceramic recuperator, said pressure being determined by the pressure loss in the metal recuperator on the one hand, and from the gas or fuel burner on the other.

It is the object of my invention to provide a method of operating a heat exchanger which has a ceramic recuperator and a metal recuperator so that the air pressure within the ceramic recuperator is not determined by the pressure loss in the metal recuperator, and so that admission of cold air directly into the ceramic recuperator is avoided. The method of the invention is particularly useful for soaking pits, in which an influx of fuel gases of varying temperatures and amounts must be taken into account during operation. The invention furthermore takes into consideration the low impermeability to air or gas of ceramic recuperators to minimize losses of warmed air flowing therethrough.

In order to achieve the foregoing objectives, I blow the air to be warmed through the metal recuperator in such a way that at the entrance to the ceramic recuperator, this air has no overpressure or underpressure relative to atmospheric pressure, or only a small amount of same. Accordingly, the pressure of the warmed air from the metal recuperator is substantially that of atmospheric pressure when delivered to the ceramic recuperator (as used in the claims, the term "substantially that of atmospheric pressure" includes pressures equal to atmospheric and small amounts above and below atmospheric pressure). In this way, the burner can draw from the ceramic recuperator whatever amounts of warmed air it needs to fulfill its requirements for desired operation and for changes in operating conditions in the soaking pit or other types of furnaces with which the combination heat exchanger is used. Consequently, underpressure in the ceramic recuperator is produced solely by the suction, drawing or pulling action of the burner.

The heat exchanger for carrying out this process is preferably provided on the air inlet side of the metal recuperator with a device, such as a ventilator, blower, fan, etc., which blows the air to be warmed and consumed through said metal recuperator. On the air outlet side of the metal recuperator is a discharge pipe or tube having an adjustable control valve or damper. Thus, when the metal recuperator supplies more or excess warmed air to the ceramic recuperator than is required by the burner, then the excess air may be discharged by way of said pipe according to a selected adjustment of the control valve or damper.

The drawing illustrates an exemplified embodiment of such a heat exchanger. Hot waste gases flow through waste gas channel 1 in the direction indicated by arrows 2, 3 and 4, and are exhausted in the direction of arrow 5. The air to be warmed is conducted through pipe 6 in the direction of arrow 7 into the distribution chamber 8 of a first section 9 of a metal recuperator 9a. It is then conducted from collecting chamber 10 over line 11 to distributor 12, and from there to the pipes of a second section 13 of the metal recuperator 9a. By way of collecting chamber 14 and pipe 15, the combustion air reaches the individual sections 16, 17, 18 and 19 of the ceramic recuperator, and from there is conducted by way of pipe 20 to a conventional burner 25.

Connected into pipe 6 is a blower 21 which forces the air to be warmed through metal recuperator 9a and conveys it to the entrance 22 of the ceramic recuperator without any mentionable underpressure or overpressure relative to atmospheric pressure and in a volume at least equal to the maximum amount of warmed air required by the burner 25. Preferably, the blower 21 operates so that the pressure of the air entering the metal recuperator through pipe 6 is substantially equal to the pressure losses resulting from flow of the air therethrough. As a result, the air (now warmed) exiting from the metal recuperator 9a is at a pressure substantially that of atmospheric pressure. Of course, the blower 21 and the metal recuperator 9a have capacity and ability to supply the ceramic recuperator with warmed air in a volume at least equal to the maximum amount required by the burner.

Because the warmed air made available by the metal recuperator to the ceramic recuperator is at a pressure substantially that of atmospheric pressure and is in a volume at least equal to the maximum required by the burner, operation of the burner causes the warmed air for combustion to flow through the ceramic recuperator in amounts substantially equal to that required thereby including those amounts needed for meeting changes in operation of the soaking pit.

Pipe 23 provided with an adjustable valve or damper 24 opens into pipe 15. If less combustion air is consumed by the burner than that which is blown through the metal recuperator, then the excess air is exhausted by way of pipe 23. The amount of exhausted air is controlled by damper 24 so that excess warmed air escapes without causing a build-up in pressure substantially above atmospheric pressure at the entrance 22 of the ceramic recuperator. Thus, the pipe 23 and damper 24 assist in maintaining the pressure of the warmed air delivered to the ceramic recuperator and available thereto at substantially that of atmospheric pressure. Since the air exiting from the metal recuperator is substantially that of atmospheric pressure as is the pressure of the warmed air entering the ceramic recuperator through pipe 15, no cold air or air at ambient temperature enters the ceramic recuperator.

While I have shown and described a present preferred embodiment of my invention, it is understood that it may be otherwise embodied within the scope of the following claims.

I claim:

1. In a method of operating a heat exchanger comprising a ceramic recuperator and a metal recuperator connected to said ceramic recuperator wherein air to be warmed and consumed in combustion with a fuel flows firstly through said metal recuperator and secondly through said ceramic recuperator and then to a fuel burner means connected to said ceramic recuperator, the invention comprising forcing said air to be warmed and required by said burner for combustion of said fuel through said metal recuperator to produce warmed air substantially at atmospheric pressure, delivering said warmed air substantially at atmospheric pressure, to said ceramic recuperator in a volume at least equal to the maximum amount of air required by said burner in its operation, coordinating drawing said warmed air through said ceramic recuperator to additionally warm same for use by said burner and regulating escape from said heat exchanger of a portion of said warmed air prior to its delivery to said ceramic recuperator to provide said ceramic recuperator with said warmed air at or below atmospheric pressure, and to exhaust from said heat exchanger warmed air in excess of requirements of said burner.

2. In heat exchange apparatus, the invention comprising a metal recuperator, a ceramic recuperator connected to said metal recuperator by a conduit means adapted for flow of air to be heated and consumed in combustion with a fuel firstly through said metal recuperator to form warmed air and secondly through said ceramic recuperator and then to a fuel burner connected to said ceramic recuperator, cooperating means connected to said metal recuperator for forcing said air to be warmed therethrough, said cooperating means being such that it supplies to said ceramic recuperator said air which traverses said metal recuperator in a volume at least equal to the maximum amount of said air required by a fuel burner in its operation, and substantially at atmospheric pressure, operative means connected to said ceramic recuperator for drawing said warmed air therethrough, valve controlled means interconnected into said conduit means between said metal recuperator and said ceramic recuperator for effecting regulated escape of said warmed air from said apparatus, said valve controlled means being so adjusted relative to operation of said drawing means that said warmed air supplied to said ceramic recuperator is at or below atmospheric pressure and that said warmed air in excess of requirements of a burner is exhausted from said apparatus 3. The invention of claim 2 characterized by said drawing means being a fuel burner.

References Cited in the file of this patent
UNITED STATES PATENTS

| | | |
|---|---|---|
| 1,574,546 | Bell | Feb. 23, 1926 |
| 1,794,774 | Jacobus | Mar. 3, 1931 |
| 2,064,444 | Mosshart et al. | Dec. 15, 1936 |
| 2,152,546 | Fitch | Mar. 28, 1939 |
| 2,478,504 | Ruegg | Aug. 9, 1949 |
| 2,627,398 | Hepburn | Feb. 3, 1953 |
| 2,639,910 | Cone et al. | May 26, 1953 |